Figure 1:
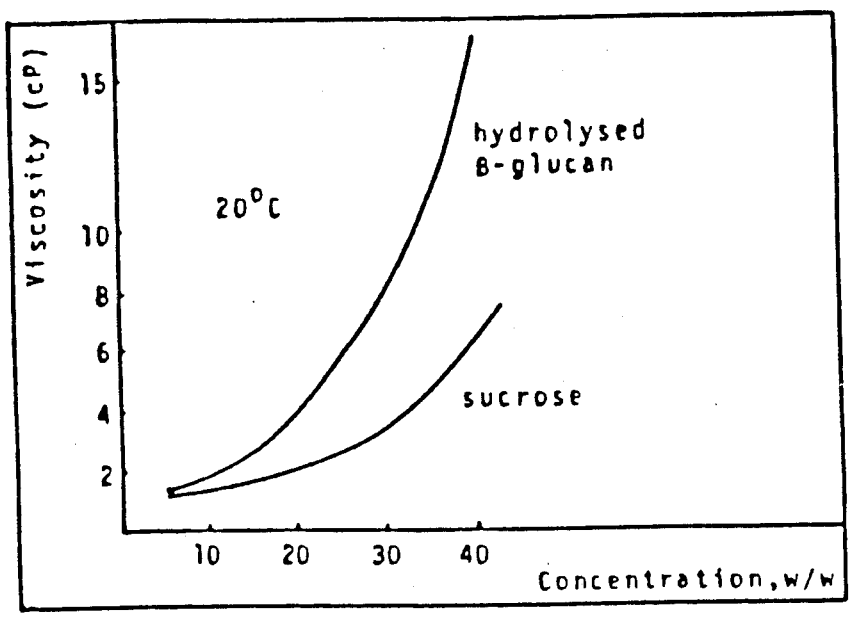

United States Patent [19]

Jensen et al.

[11] Patent Number: 4,871,571
[45] Date of Patent: Oct. 3, 1989

[54] DIETETIC FOODSTUFF CONTAINING LOW CALORIE BULKING AGENT

[75] Inventors: Villy J. Jensen, Bagsvaerd; Sven Pedersen, Gentolfte; Hans A. S. Olsen, Holte, all of Denmark

[73] Assignee: Novo Industri A/S, Bagsvaerd, Denmark

[21] Appl. No.: 67,871

[22] Filed: Jun. 30, 1987

[51] Int. Cl.$^4$ .................. A23L 1/236; A23L 2/00; A23G 9/00; A21D 13/00

[52] U.S. Cl. .................. 426/548; 426/549; 426/565; 426/590; 426/658; 435/95

[58] Field of Search ............... 426/548, 549, 565, 590, 426/658; 435/95

[56] References Cited

U.S. PATENT DOCUMENTS

| | | | |
|---|---|---|---|
| 3,766,165 | 10/1973 | Rennhard | 260/209 R |
| 3,880,742 | 4/1975 | James et al. | 195/31 R |
| 4,021,543 | 5/1977 | McKay | 424/180 |
| 4,024,290 | 5/1977 | Layton | 426/548 |
| 4,459,316 | 7/1984 | Bakav | 426/658 |

FOREIGN PATENT DOCUMENTS

82/03329  10/1982  PCT Int'l Appl.
2072679  10/1981  United Kingdom.

OTHER PUBLICATIONS

Polydextrose and its Applications in Foods (Anibal Torres & Raul D. Thomas), Food Technology–Jul. 1981, pp. 44–49.

Nondigestibility of a New Sweetener, "Neosugar," in the Rat by T. Oku, T. Tolunaga and N. Gosoya, Univ. of Tokyo, Japan., pp. 1574–1581.

Lo Calorie Bulking Agents–by J. J. Beereboom, Pfizer, Inc. Food Science and Nutrition, May, 1979, pp. 401–413.

B–Glucan and B–Glucanase–Review. Tech. Quarterly, vol. 9, No. 3, 1972.

*Primary Examiner*—Marianne Cintins
*Attorney, Agent, or Firm*—Morris Fidelman; Franklin D. Wolffe

[57] ABSTRACT

A bulking agent which can replace sucrose and other soluble simple carbohydrates in food, the active component of which is a glucose oligomer or a mixture of glucose oligomers, DP=3, or 4, wherein each oligomer exhibits one beta-1,3-glucosidic bond, all other bonds being beta-1,4-glucosidic bonds. The bulking agent has a satisfactory taste and a satisfactory stability at low pH values. The bulking agent can be produced by hydrolysis of $\beta$-glucan.

3 Claims, 2 Drawing Sheets

DIETETIC FOODSTUFF CONTAINING LOW CALORIE BULKING AGENT

This invention relates to a low calorie bulking agent, and to employment of a beta-glucan hydrolysate in substitution for sucrose, glucose and the like in dietetic foodstuffs.

BACKGROUND

An overall art discussion concerning the problems in relation to and the need for low calorie bulking agents is to be found in CRC Critical Reviews in Food Science and Nutrition, May 1979, pages 401–413, Low Calorie Bulking Agents, by J. J. Beereboom et al. In this discussion it is stated that low calorie food of good quality can only be made with bulking agents having physical properties permitting replacement of the bulk and functional properties of the usual fat or carbohydrate, and also that two types of bulking agents for carbyhydrates are needed: (1) a soluble material that can replace sucrose and other simple carbohydrates in food, and (2) an insoluble material capable of replacing flour or starch. This invention is concerned with the soluble material type of bulking agent.

Among the known (low calorie) bulking agents of this kind Neosugar and Polydextrose are believed to be those most used commercially, and, thus, are presumed to be those considered by the art heretofore as the best in regard to properties which should be exhibited by bulking agents of the soluble type. They are not, however, ideal.

Neosugar (No. GB 2.072.679, and the Journal of Nutrition, Volume 114, No. 9, Sept. 1984, pp. 1574–1581), is sweet which is not necessarily an advantage as it is often wanted to achieve a controlled level of sweetness e.g. by means of an artificial sweetener, and further, Neosugar would exhibit an inferior stability at low pH values, if used in acidic drinks such as Coca Cola TM and the like. Neosugar is a sweenener comprising oligosaccharides having from 1 to 4 molecules of fructose bound to sucrose.

Polydextrose (U.S. Pat. No. 3,766,165, Food Technology, July 1981, 35 (7), 44049 (1981)), on the other hand, has a satisfactory stability at low pH values in acid drinks, but it exhibits an acid bitter taste which is difficult to mask.

Other bulking agents have been sugested to the art. For example, U.S. Pat. No. 4,459,316 describes sweetening foods with non-caloric di- or trisaccharides having L-hexose component However, the L-hexoses ordinarily do not exist in nature and cannot be assimilated by the human organizm, but are also expensive.

WO 82/03329 describes glucose polymers and a method for production thereof.

Thus, a need exists for an improved low calorie bulking agent that can replace sucrose and other soluble, low molecular weight carbohydrates in food. The bulking agent should exhibit the following combination of desirable properties: a) satisfactory taste, i.e. an almost neutral taste and at any rate not an acid, bitter taste; and b) satisfactory stability at low pH values.

BRIEF STATEMENT OF INVENTION

The low calorie bulking agent according to the invention, which can replace sucrose and other soluble, simple carbohydrates in food, comprises a glucose oligomer or a mixture of glucose oligomers, in which DP=3 or 4, and wherein each oligomer exhibits one beta-1,3-glucosidic bond, all other bonds being beta-1,4-glucosidic bonds. DP is an abbreviation for degree of polymerization.

Surprisingly, it has been found that the bulking agent according to the invention exhibits satisfactory taste and high stability at low pH level. Also, the bulking agent according to the invention exhibits superior body, closely resembling the body of a corresponding sucrose solution.

The bulking agent according to the invention is produced from $\beta$-glucan as a starting material. It should be understood therefore that commercial embodiments of bulking agent according to the invention can contain other oligomers, e.g. the pentasaccharide, and/or higher oligomers, and impurities.

Also, the invention comprises a method for production of the bulking agent the method being characterized by the fact that beta-glucan is hydrolysed with beta-glucanase, whereafter the beta-glucanase is inactivated, and the reaction mixture is purified and concentrated.

DISCUSSION OF THE INVENTION

Figure 2:
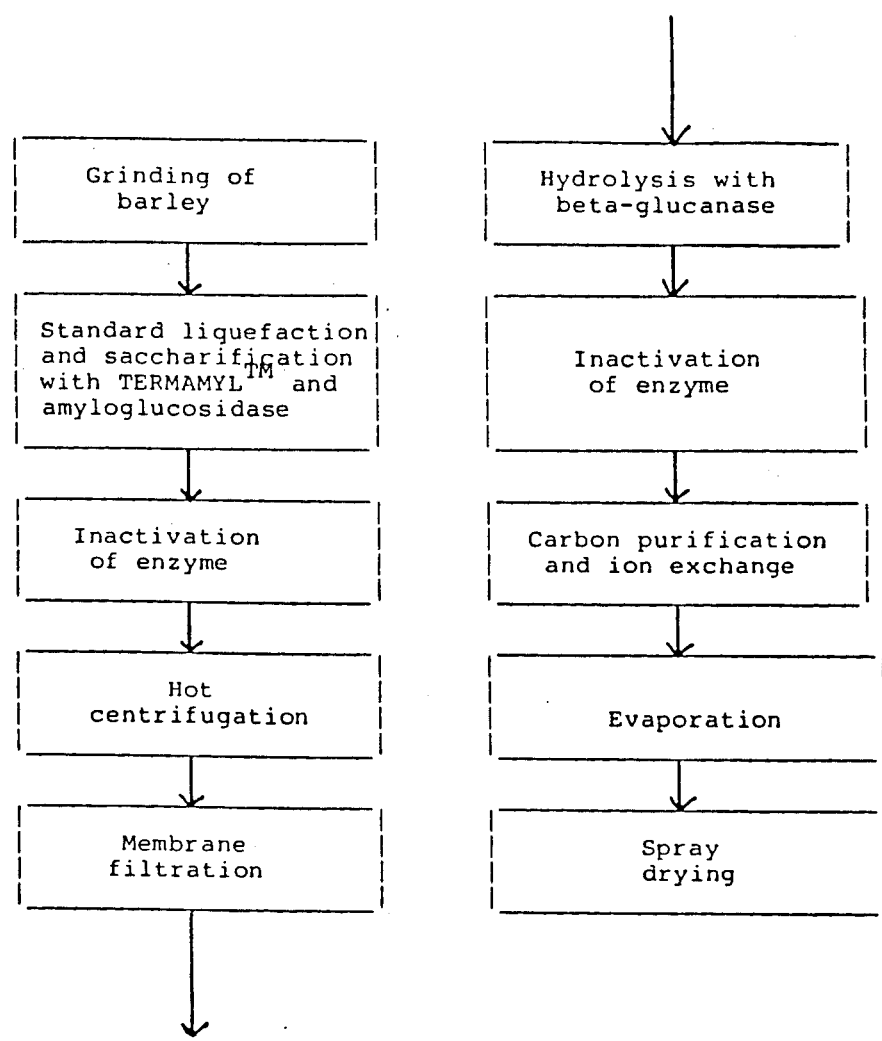

For further understanding of the invention, reference is made to the attached drawing wherein:

FIG. 1 is a graph illustrating viscosity versus concentration for the bulking agent and for sucrose in equeous solution at 20° C.; and, FIG. 2 is a flow sheet illustrating the individual steps of the process for making the bulking agent.

The glucose oligomer or the mixture of glucose oligomers employed for the bulking agent of the invention are known per se, reference being made of e.g. Technical Quarterly Vol. 9, No. 2 (1972), p. 151–157. They are derived from beta-glucan.

In practice of the invention, the beta-glucan can be produced by grinding e.g. of barley or oats, standard liquefaction and saccharification by means of alpha-amylase, (e.g. TERMAMYL TM ) and amyloglucosidase, inactivation of enzyme, hot centrifugation, and membrane filtration, whereby the beta-glucan is to be found in the concentrate, all as illustrated by the flow sheet of FIG. 2.

The beta-glucan is then hydrolyzed with beta-glucanase purified by treatment with carbon and ion exchange, then converted into a solid powder product Optionally, the product form of the bulking agent may be an aqueous solution, in analogy to and in substitution for the sucrose, fructose or glucose solutions employed in food products, particularly beverages.

It should be appreciated that the bulking agent, as prepared according to the above method, contains minor amounts of oligomers with DP 2 and DP 5. It has been found that these minor components do not generate any harmful effects.

A preferred embodiment of the method according to the inventon is characterized by the fact that the purification is carried out by means of active carbon and ion exchange, and that the concentration is carried out by evaporation and spray drying. This embodiment is cheap and simple, and delivers the bulking agent in a high yield Also, the invention comprises a use of the bulking agent according to the invention, i.e. in a nutrient or a stimulant, as a substitute for sucrose or other simple, soluble carbohydrate.

A preferred embodiment of the use according to the invention is characterized by the fact that the nutrient or the stimulant is a beverage, an ice cream or a cookie. It has been found that the bulking agent according to the invention functions very well in such nutrients or stimulants, and that the stability, especially in carbonated drinks, is excellent.

Finally the invention comprises a nutrient or a stimulant containing a bulking agent, wherein the bulking agent is the bulking agent according to the invention. Any nutrient or stimulant, which contains sugar as sucrose or similar sugars, can e converted to a nutrient or stimulant according to the invention by complete or partial substitution of the sucrose or other sugar(s) with the bulking agent.

A preferred embodiment of the nutrient or stimulant according to the invention is characterized by the fact that the nutrient or the stimulant contains 1–50% by weight, preferably 5–25% by weight of the bulking agent calculated on the weight of the nutrient or stimulant product. These intervals cover the optimal incorporated amounts of the bulking agent in the many different nutrient or stimulants in regard to body, other organoleptic properties, and economy, the exact proportions of bulking agent depending on the nutrient or stimulant, e.g. a salad dressing, a marmelade, a pudding, a gelatin dessert, marzipan, a carbonated drink, an ice cream, a cookie, a cake, candies, hard candies, maple syrups, caramels, toffee, gumdrops, nougat, marshmallows, and chewing gum.

I n order to demonstrate the superiority of the bulking agent according to the invention in regard to stability in an acid environment, comparative experiments with sucrose and Neosugar were carried out in the following manner 10% (w/w) solutions of sucrose, Neosugar, and the bulking agent according to the invention, made as described in the Example 1 hereinafter, were prepared and adjusted to different pH values and temperatures (30° C. and 60° C.). After given storage periods of 2,6,24 hours the percentage decomposition was measured according to the formula $$\% \text{ decomposition at time } t = 100 - \frac{DP_2^+ \text{ at time } t}{DP_2^+ \text{ at time } O} \times 100$$

wherein $DP_2^+$ is the amount of oligomers with a DP of 2 or more. The values in the tables below are the percentage decomposition, as defined above Whenever in the following reference is made to a specific embodiment of the bulking agent according to the invention, used in a specific experiment, this embodiment is the bulking agent according to the invention, prepared as described later in Example 1.

TABLE 1

|  | 30° C. | | |
|---|---|---|---|
|  | pH | 2 h | 6 h | 24 h |
| Sucrose | 2 | 6.4 | 15.0 | 40.3 |
|  | 3 | 0 | 3.7 | 6.7 |
|  | 4 | 0 | 0 | 0 |
|  | 5 | 0 | 0 | 0 |
|  | 6 | 0 | 0 | 0 |
|  | 7 | 0 | 0 | 0 |
| Neosugar | 2 | 10.0 | 19.0 | 48.7 |
|  | 3 | 1.5 | 3.0 | 6.4 |
|  | 4 | 0 | 0 | 0 |
|  | 5 | 0 | 0 | 0 |
|  | 6 | 0 | 0 | 0 |
|  | 7 | 0 | 0 | 0 |

TABLE 1-continued

|  | 30° C. | | |
|---|---|---|---|
|  | pH | 2 h | 6 h | 24 h |
| Bulking agent according to invention | 2 | 0 | 0 | 0 |
|  | 3 | 0 | 0 | 0 |
|  | 4 | 0 | 0 | 0 |
|  | 5 | 0 | 0 | 0 |
|  | 6 | 0 | 0 | 0 |
|  | 7 | 0 | 0 | 0 |

TABLE 2

|  | 60° C. | | | |
|---|---|---|---|---|
|  | H | 2 h | 5 h | 24 h | 48 h |
| Sucrose | 2 | 86.3 | 97.2 | 100 | 100 |
|  | 3 | 18.9 | 31.8 | 53.2 | 77.2 |
|  | 4 | 4.1 | 5.8 | 7.0 | 10.8 |
|  | 5 | 0 | 0 | 0 | 1.6 |
|  | 6 | 0 | 0 | 0 | 0 |
|  | 7 | 0 | 0 | 0 | 0 |
| Neosugar | 2 | 86.5 | 94.5 | 96.1 | 96.9 |
|  | 3 | 23.1 | 38.4 | 42.3 | 67.0 |
|  | 4 | 3.7 | 6.4 | 6.6 | 20.2 |
|  | 5 | 0 | 0 | 0 | 4.9 |
|  | 6 | 0 | 0 | 0 | 0 |
|  | 7 | 0 | 0 | 0 | 0 |
| Bulking agent according to invention | 2 | 0 | 0 | 2.4 | 4.2 |
|  | 3 | 0 | 0 | 0 | 1.3 |
|  | 4 | 0 | 0 | 0 | 0 |
|  | 5 | 0 | 0 | 0 | 0 |
|  | 6 | 0 | 0 | 0 | 0 |
|  | 7 | 0 | 0 | 0 | 0 |

The bulking agent according to the invention evidenced a superior stability, at low pH values.

The superiority of the bulking agent according to the invention in regard to taste in different stimulants is believed to be important, reference being made to the article Polydextrose in Food Technology, July 1981 (35) 7, 44–49 (1981), especially page 45, from which it appears that Polydextrose exhibits a bitter taste, and to the below described experiments with bulking agent prepared as described later in Example 1.

EXPERIMENT A

For the sake of brevity, a sugar-free Soda Stream TM citrus soft drink concentrate will be referred to in the following as $C_1$.

A control soft drink was prepared by dilution of 22.2 g of $C_1$ with water to 200 cm³, whereafter 18 g of sucrose were added. Finally, the drink was carbonated by means of the Soda Stream TM carbonating apparatus.

A soft drink with the bulking agent was prepared like the control soft drink, only instead of the sucrose 0.1 g of Aspartame and 4 g of the bulking agent according to the invention, prepared as described in Example 1, were added. A trained taste panel consisting of ten persons advised that this soft drink had taste and body comprable to the control soft drink, i.e. a pleasant sweet taste without any bitterness whatsoever. When less than 4 g of the bulking agent is employed the body did not correspond to the body of the control soft drink. The differing viscosity characteristics of sucrose and the bulking agent, see the graph of FIG. 1, should be taken into account when the bulking agent is substituted for sucrose. Appropriate substitution will not always be gram for gram.

EXPERIMENT B

A control ice cream was made up by mixing and freezing the following mixture. 15 g of sucrose, 100 g of whipped cream, 1 egg, and 1 g of vanilla sugar. An ice cream with the bulking agent according to the invention was prepared as the control ice cream, only instead of the sucrose 15 g of the bulking agent according to the invention, prepared as described in Example 1, and 0.0833 g of Aspartame were added. According to a trained panel consisting of ten persons this ice cream had a pleasant taste corresponding to the taste of the control ice cream, i.e. without any bitterness whatsoever.

Thus, the bulking agent according to the invention exhibits satisfactory taste without any bitterness whatsoever Digestibility should be zero for an ideal bulking agent. However, the bulking agent of the invention is digested to some extent, but the digestibilities of the known bulking agents Neosugar and Polydextrose are not zero either. As may be seen from the following comparative digestibility experiments with sucrose, Polydextrose, Neosugar and the bulking agent according to the invention, prepared as described in Example 1, the digestibility of the bulking agent according to the invention is comparable to the digestibility of the prior art bulking agent Polydextrose.

EXPERIMENT C

The conditions and the results in relation to the digestibility experiments with rats in groups of five rats are provided.

The control diet consisted of the following ingredients in the indicated ratios:

| | |
|---|---|
| Corn starch | 68,4% |
| casein + methionin | 15,0% |
| corn oil | 7,0% |
| cellulose | 4,0% |
| vitamins | 1,6% |
| minerals | 4,0% |

Four other diets were prepared by substituting for corn starch corresponding to 10% by weight of the entire control diet equal amounts respectively: of the bulking agent according to the invention; Neosugar; Polydextrose; and sucrose.

Groups comprising five rats in each group were fed with these diets, and the digestible dry matter was measured after a preliminary period of 10 days by differential gravimetric determination.

The results appear in the following table.

| Diet with | Rat no. | Digestible dry matter (%) |
|---|---|---|
| | 1 | 92.5 |
| | 2 | 92.9 |
| Bulking agent | 3 | 91.9 |
| according to | 4 | 92.7 |
| the invention | 5 | 92.0 |
| | $\bar{x}$ | 92.4 |
| | 6 | 89.7 |
| | 7 | 90.4 |
| | 8 | 93.7 |
| Polydextrose | 9 | 93.6 |
| | 10 | 91.4 |
| | $\bar{x}$ | 91.8 |
| | 11 | 94.7 |
| | 12 | 92.8 |
| | 13 | 93.1 |
| Neosugar | 14 | 92.0 |
| | 15 | 92.6 |
| | $\bar{x}$ | 93.0 |

| Diet with | Rat no. | Digestible dry matter (%) |
|---|---|---|
| | 16 | 93.2 |
| | 17 | 94.3 |
| | 18 | 94.2 |
| Beet sugar | 19 | 94.4 |
| | 20 | 94.3 |
| | $\bar{x}$ | 94.1 |
| | 21 | 94.6 |
| | 22 | 94.7 |
| Control | 23 | 94.7 |
| diet | 24 | 94.5 |
| | 25 | 94.5 |
| | $\bar{x}$ | 94.4 |

The digestible dry matter, x %, of the bulking agents, assuming additivity of the values of digestible dry matter of the components in the diet, can thus be calculated, e.g. for the bulking agent according to the invention, by means of the equation:

$$0,9 \cdot 94.4 + 0,1 \cdot x = 92.4$$

$$x = 74\%$$

TABLE D

| Bulking agent | Digestible dry matter, % |
|---|---|
| Bulking agent according to the invention | 74 |
| Polydextrose | 68 |
| Neosugar | 80 |

Later, after an additional 6 weeks the weight increase was measured. The results appear from the following table.

TABLE E

| | Bulking agent acc. to the inv. | Polydextrose | Neosugar | Sucrose | Control |
|---|---|---|---|---|---|
| Average weight increase, g | 206.91 | 214.66 | 206.83 | 220.11 | 215.59 |
| Standard deviation | 10.68 | 21.72 | 6.24 | 8.54 | 14.33 |
| SEM (Standard deviation estimate of means) | 4.77 | 9.71 | 2.79 | 3.82 | 6.41 |

The percentual weight difference, y % of the bulking agent, taking the sucrose as a control with an assumed digestibility of 100%, thus can be calculated according to the equation:

$$y = \frac{220.11 - 206.91}{220.11} \times 100\% = 5.9\%$$

As the bulking agent is only 10% of the diet, the digestibility, x %, can be calculated according to the equation:

$$x = (10 - 5.9) \times 10 = 41\%$$

The digestibility of Polydextose and Neosugar can be calculated in a similar manner. In the following table the calculated 6 weeks digestibilities of the bulking agents are shown.

| Bulking agent | Digestibility, % |
|---|---|
| Bulking agent according to the invention | 41 |
| Polydextrose | 75 |
| Neosugar | 40 |

From the above figures it appears that the digestibility of the bulking agent according to the invention is at least comparable to the digestibilities of the bulking agents known to the prior art, and thus that the bulking agent according to the invention also can be classified as a low calorie nutrient.

The viscosity increasing capacity should be high for an ideal bulking agent. Comparative experiments carried out with sucrose and bulking agent prepared as described in Example 1 evidence that on a g-to-g basis the bulking agent according to the invention exhibits a higher viscosity increasing capacity than sucrose, the data being the basis for the graph of FIG. 1.

Practice of the invention will be described in detail in the following Examples 1 to 3, whereby Example 1 is a preparation example, and Example 2 and 3 are use examples.

$$y = \frac{220.11 - 206.91}{220.11} \times 100\% = 5.9\%$$

As the bulking agent is only 10% of the diet, the digestibility, x %, can be calculated according to the equation:

$$x = (10 - 5.9) \times 10 = 41\%$$

The digestibility of Polydextose and Neosugar can be calculated in a similar manner. In the following table the calculated 6 weeks digestibilities of the bulking agents are shown.

TABLE F

| Bulking agent | Digestibility, % |
|---|---|
| Bulking agent according to the invention | 41 |
| Polydextrose | 75 |
| Neosugar | 40 |

From the above figures it appears that the digestibility of the bulking agent according to the invention is at least comparable to the digestibility of the bulking agents known to the prior art, and thus that the bulking agent according to the invention also can be classified as a low calorie nutrient. The viscosity increasing capacity should be high for an and bulking agent. Comparative experiments carried out with sucrose and bulking agent prepared as described in Example 1 evidence that on a g-to-g basis the bulking agent according to the invention exhibits a higher viscosity increasing capability than sucrose, the data being the basis for the graph of FIG. 1.

Practice of the invention will be described in detail in the following Examples 1 to 3, whereby Example 1 is a preparation example, and Example 2 and 3 are use examples.

EXAMPLE 1

Reference is made to the flow sheet of FIG. 2 which illustrates the individual steps of the process hereinafter described.

300 kg of Nordahl barley (Nielsen og Smith A/S, Denmark) were ground in a pin mill. The thus treated barley was transferred to 1,200 l of boiling water (boiling in order to inactivate the barley beta-glucanase). pH was adjusted to 6.0 and 0.55 kg of $CaCl_2.2H_2O$ was added (100 ppm). Then 1.2 kg of (TERMAMYL TM 60 L) amylase is added (0.4% on a dry basis). The mixture is boiled for 30 minutes, and the mixture is held for two hours at 95° C. Then the temperature is lowered to 60° C., pH is adjusted to 4.5, and 0.6 kg of AMG 200 L amyloglucosidase is added. Hydrolysis time is 20 hours. Then the enzymes are inactivated by boiling for 20 minutes. Then the mixture is centrifuged at 75° C. by means of a Westphalia SC 35 centrifuge. The centrifugate (ab. 80%) exhibited a dry matter content of about 16%. The centrifugate was ultrafiltered on a membrane filtration apparatus in pilot plant (membrane area 4 m2, GR 60 P membrane). The temperature was 55° C., and the ultrafiltration lasted for about 48 hours with accompanying wash of the module during ultrafiltration. The dry matter content in the concentrate was 11.6 kg (150 l with 7.7% dry matter) corresponding to a yield of 4%, calculated on the basis of the original amount of barley. The pH value of the retentate was adjusted to 5.0, and 0.58 kg of FINIZYM 200 L beta-glucanase was added, whereafter hydrolysis was carried out for 24 hours at 50° C. The enzyme was inactivated by direct steam injection in the tank, corresponding to a temperature of 90° C. for 20 minutes. The product was carbon purified twice. The first time 1.2 kg of carbon and 0.5 kg of Hiflo Supercell filter aid are added to the 150 l of reaction mixture, and the second time 1.4 kg of carbon and 1 kg of Hiflo Supercell filter aid are added to the reaction mixture The reaction mixture is evaporated to a final volume of 50 l, and then a freeze drying and a grinding are carried out. The yield was 5.6 kg of bulking agent, corresponding to 2% calculated on the basis of the original amount of barley. By means of HPLC the following composition of the bulking agent was found: $DP_5{}^+ = 12.8\%$, $DP_4 = 25.4\%$, $DP_3 = 54.9\%$, $DP_2 = 6\%$, and $DP_1 = 0.9\%$.

By means of NMR analysis the constitution of the trisaccharide (DP=3) was determined as O -beta-D-glucopyranosyl-(1,3)-O-beta-D-glucopyranosyl-(1,4)-D-glucose, and also, the constitution of the tetrasaccharide (DP=4) was determined as about 80% of O-beta-D-glucopyranosyl-(1,4)-O-beta-D-glucopyranosyl-(1,3)-O-beta-D-glucopyranosyl-(1,4)-D-glucose and about 20% of O-beta-D-glucopyranosyl-(1,3)-O-beta-D-glucopyranosyl-(1,4)-O-beta-D-glucopyranosyl-(1,4)-D-glucose.

EXAMPLE 2

A control sugar cookie mix was prepared by mixing 50 g of margarine, 75 g of sucrose, ½ egg, 62 g of flour, 1 g of NaCl, ½ teaspoonful of vanilla sugar, and 40 g of pure household chocolate. A sugar cookie mix with the bulking agent according to the invention, made as described in Example 1, was prepared, wherein the 75 g of sucrose were substituted by 75 g of the bulking agent according to the invention and 0.5 g of Aspartame. Both mixes were shaped to usual sugar cookies and baked for 12 minutes at 185° C. According to a trained panel consisting of ten persons the low calorie sugar cookies with the bulking agent according to the invention had an excellent taste, completely matching the taste of the control sugar cookies.

EXAMPLE 3

Two samples of marzipan were made up as follows
I (Control)
  47.5 g of deskinned, chopped almonds
  12.5 g of sugar
  2 teaspoons of water
  1 teaspoon of albumin II (according to the invention)
  47.5 g of deskinned, chopped almonds
  12.5 g of bulking agent according to the invention
  0.07 g of Aspartame
  2 teaspoons of water
  1 teaspoon of albumin When evaluated by a trained panel consisting of 10 persons it turned out that around half of the members of the panel preferred the marzipan according to the invention, and around half of the members of the panel preferred the control marzipan.

We claim:

1. A dietetic foodstuff formed from a foodstuff composition comprising nutrients, an artificial sweetener and a bulking agent the bulking agent being in an amount of 1–50% by weight of said composition, said bulking agent being in substitution for simple soluble carbohydrates that otherwise would be present in said foodstuff composition, said bulking agent being a glucose oligomer of DP 3 or 4 or a mixture thereof, each oligomer having one beta-1,3glucosidic bond, all additional bonds being beta-1,4glucosidic bonds whereby the foodstuff is dietetic in character.

2. The dietetic food of claim 1 wherein said bulking agent comprises a beta glucan hydrolysate oligomer mixture in which DP-3 and DP-4 oligomers constitute at least about 75% by weight thereof.

3. The dietetic foodstuff of claim 1 further comprising a carbonated drink, an ice cream or a cookie.

* * * * *

UNITED STATES PATENT AND TRADEMARK OFFICE
CERTIFICATE OF CORRECTION

PATENT NO. : 4,871,571

DATED : October 3, 1989

INVENTOR(S) : Villy J. Jensen et al

It is certified that error appears in the above-identified patent and that said Letters Patent is hereby corrected as shown below:

Col. 1, line 20, "carbyhydrates" should read -- carbohydrates --.

Col. 1, line 51, "component" should read -- component. --.

Col. 2, line 28, "equeous" should read -- aqueous --.

Col. 2, line 48, "product" should read -- product. --

Col. 2, line 64, "yield" should read -- yield. --.

Col. 3, line 12, "e" should read -- be --.

Col. 3, line 49, "above" should read -- above. --.

Col. 4, lines 55,56, "comprable" should read -- comparable --.

Col. 4, line 67, "mixture." should read -- mixture: --.

Col. 5, line 13, "soever" should read -- soever. --.

Col. 7, line 57, "and" should read -- ideal --.

Col. 8, lines 11,12, "(TERMAMYL TM 60 L)" should read -- TERMAMYL TM 60 L --.

Col. 8, line 22, "m2" should read -- $m^2$ --.

UNITED STATES PATENT AND TRADEMARK OFFICE
CERTIFICATE OF CORRECTION

PATENT NO. : 4,871,571

DATED : October 3, 1989

INVENTOR(S) : Villy J. Jensen et al.

It is certified that error appears in the above-identified patent and that said Letters Patent is hereby corrected as shown below:

Col. 8, line 48, "O -beta.." should read -- O-beta... --.

Signed and Sealed this

Thirtieth Day of April, 1991

Attest:

Attesting Officer

HARRY F. MANBECK, JR.

Commissioner of Patents and Trademarks